United States Patent [19]

Ohtsuka et al.

[11] 4,400,604
[45] Aug. 23, 1983

[54] HEAT TREATING METHOD AND APPARATUS USING MICROWAVE

[75] Inventors: Katsuyuki Ohtsuka, Mito; Hiroaki Miyo; Daisaku Hayashi, both of Katsuta, all of Japan

[73] Assignee: Doryokuro Kakunenryo Kaihatsu Jigyodan, Tokyo, Japan

[21] Appl. No.: 239,479

[22] Filed: Mar. 2, 1981

[30] Foreign Application Priority Data

Mar. 12, 1980 [JP] Japan ................................. 55-31341

[51] Int. Cl.³ ............................................. H05B 6/78
[52] U.S. Cl. .................... 219/10.55 M; 219/10.55 A; 219/10.55 R; 34/1
[58] Field of Search ............... 219/10.55 A, 10.55 R, 219/10.55 F, 10.55 E, 10.55 D, 10.55 M, 10.49 R, 10.69, 10.71, 378, 439; 34/1

[56] References Cited

U.S. PATENT DOCUMENTS

| | | | |
|---|---|---|---|
| 3,549,848 | 12/1970 | Williams | 219/10.55 A |
| 4,129,768 | 12/1978 | Anderson | 219/10.55 A |
| 4,307,277 | 12/1981 | Maeda et al. | 219/10.55 R |
| 4,310,747 | 1/1982 | Rice et al. | 219/10.55 A X |

FOREIGN PATENT DOCUMENTS

| | | | |
|---|---|---|---|
| 2712728 | 9/1978 | Fed. Rep. of Germany | 219/10.49 R |
| 52-30938 | 3/1977 | Japan | 219/10.55 M |

*Primary Examiner*—B. A. Reynolds
*Assistant Examiner*—Philip H. Leung
*Attorney, Agent, or Firm*—Wenderoth, Lind & Ponack

[57] ABSTRACT

A substance such as radioactive liquid waste is heat treated using microwave by introducing the substance into a vessel made of a material reflective to microwave and containing spherical bodies made mainly of a material transmissive (i.e. transparent) to microwave. Microwave is applied to the substance while imparting movement to the spherical bodies. The substance is heat treated while in contact with the spherical bodies and is separated from the spherical bodies and pulverized by the friction and collision between the moving spherical bodies. An apparatus for carrying out the method is described.

14 Claims, 8 Drawing Figures

FIG. 3
FIG. 4
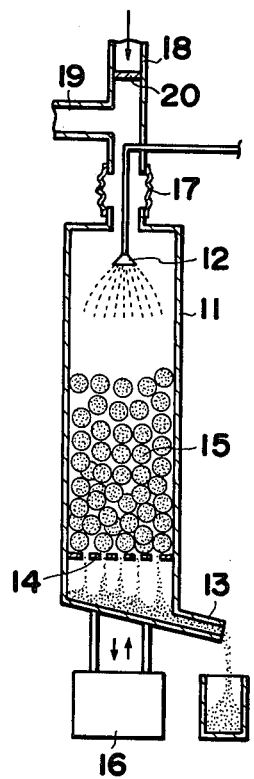
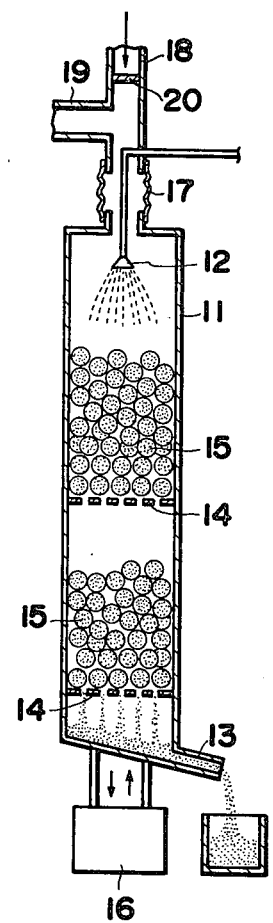

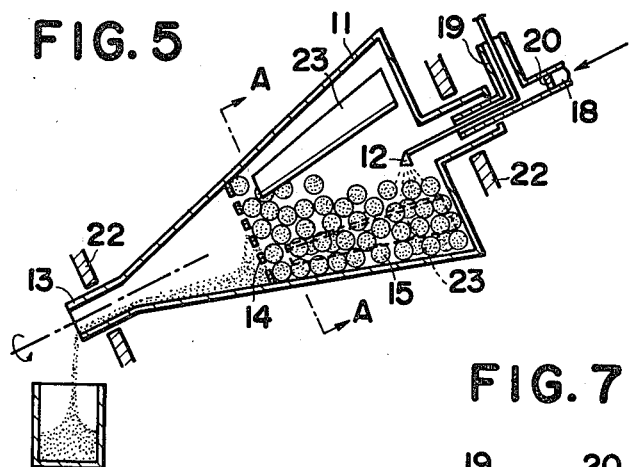
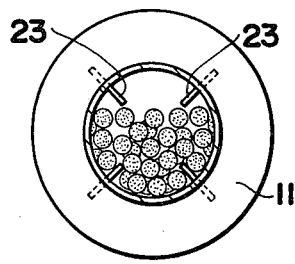
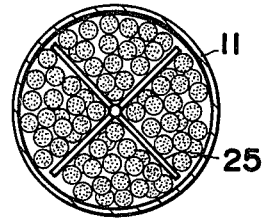
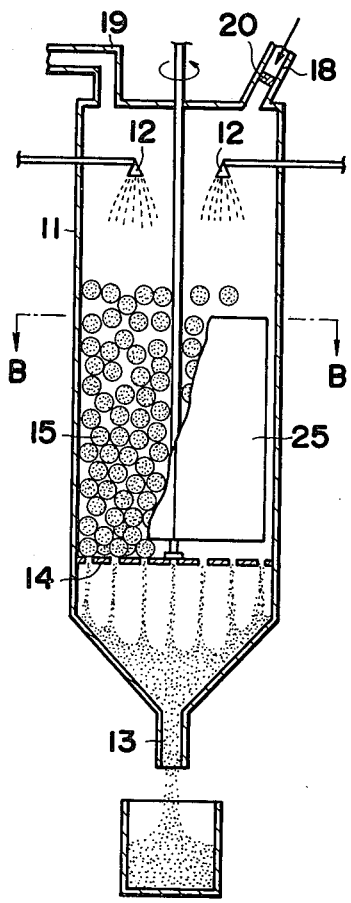

HEAT TREATING METHOD AND APPARATUS USING MICROWAVE

BACKGROUND OF THE INVENTION

The present invention relates to a heat treating method and apparatus using microwave and, more particularly, to a heat treating method and apparatus using microwave in which a substance to be treated is attached to the surfaces of movable bodies made of a microwave transmissive (i.e. transparent) material to improve the microwave irradiation efficiency.

In this specification, the term "heat treating" is used to mean various kinds of treatment depending on the nature of the treated substance and purpose of the treatment. More specifically, the "heat treating" in the sense of the invention includes various treatments effected by heating, such as evaporation, drying, roasting, reduction and so forth, as well as various treatments which are conducted simultaneously with heating, such as mixing and crushing.

The heat treating method and apparatus of the invention can most suitably, but not exclusively, be used in a plant for processing nuclear fuels for heat pulverization of nuclear fuel materials such as compounds of plutonium, uranium and so forth, as well as for heat pulverization of radioactive liquid waste.

Heat treating by microwave, which is a kind of direct heating, has a higher heating efficiency than indirect heating such as heating by steam, electricity or the like, so that the heating can be completed in a shorter period of time. Therefore, this heat treating provides various advantages when used in the heat treatment of radioactive substances, such as reduced irradiation by radioactivity and the production of powders having good properties due to uniform temperature distribution. The conventional heat treating using microwave, however, has the following drawbacks to be overcome.

Namely, when a vessel in which the heating is conducted is made of a material reflective to microwave, the microwave irradiation efficiency is impractically low. To the contrary, in the case where the vessel is made of glass or alumina, the vessel is liable to be damaged or broken. Also, in the event that the vessel is made of an organic material transmissive to microwave, such as polytetrafluoroethylne, the vessel may be burnt locally due to local adsorption of microwave. In addition, it is not possible to carry out a continuous treatment and, from the view point of critical safety management, it is not allowed to treat a large amount of radioactive substance at a time. It is also to be pointed out that a specific apparatus is necessary for mixing and crushing of the treated substance.

SUMMARY OF THE INVENTION

It is, therefore, an object of the invention to provide a heat treating method and apparatus using microwave, capable of overcoming the above-described problems of the prior art.

Namely, an object of the invention is to provide a heat treating method and apparatus in which the fear of breakage of the heating vessel is completely avoided and the treatment is effected at a high efficiency of irradiation of microwave.

Another object of the invention is to provide a heat treating method and apparatus suitable for continuous treatment and capable of performing simultaneously or continuously various processes such as drying, roasting, reduction and crushing.

Still another object of the invention is to provide a heat treating method and apparatus which can reduce, when used in the treatment of radioactive substance, the number of pieces of equipment which are inevitably disposed in the enclosure for radioactive substance and permit an easier management of critical safety, and, hence, can increase the amount of the radioactive substance to be treated, for the production of powders of properties suitable for the production of pellets.

To these ends, according to the invention, there is provided a heat treating method using microwave comprising: placing a substance to be treated in a vessel made of a material reflective to the microwave, together with a plurality of spherical bodies mainly made of a material transmissive to microwave; and applying the microwave while imparting a movement to the spherical bodies to thereby heat and treat the substance.

According to the invention, there is also provided a heat treating apparatus using microwave comprising: a vessel made of a material reflective to microwave; a microwave guiding opening for guiding microwave into said vessel; a grid partitioning the space in said vessel; regions for supplying a substance to be treated into the vessel and for discharging the substance from the vessel, said regions being disposed at wall portions of the vessel at the opposite sides of said partitioning grid; a plurality of spherical bodies made of a material transmissive to microwave and placed in the vessel at the side adjacent to said region for supplying the substance to be treated; and means for imparting a movement to said spherical bodies.

BRIEF DESCRIPTION OF THE DRAWINGS

The invention will be described hereinunder in more detail with reference to the accompanying drawings, in which:

FIG. 3, FIG. 4 and FIG. 5 are illustrations of different embodiments of the invention;

FIG. 6 is a sectional view taken along the line A—A of FIG. 5;

FIG. 7 is an illustration of still another embodiment of the invention; and

FIG. 8 is a sectional view taken along the line B—B of FIG. 7.

DETAILED DESCRIPTION OF THE INVENTION

Figure 1:
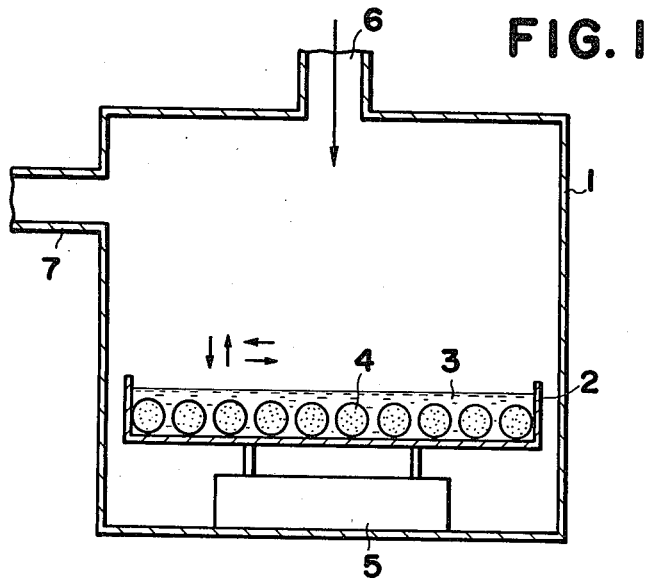
FIG. 1 is an illustration of the principle of a method of the invention.

Referring to FIG. 1 showing the principle of the invention, a metallic vessel 2 is situated in a microwave heating apparatus 1. A substance 3 to be treated is placed in the metallic vessel 2 together with a plurality of spherical solid bodies 4 made of a material transmissive to microwave, such as glass, alumina or the like.

A device 5 for imparting movement is placed at the bottom of the metallic vessel 2. This vessel 2 may be a vibration machine or a turn table. Microwave is introduced into the microwave heating apparatus 1 through the microwave guide port 6, while actuating the device 5 to cause the spherical bodies 4 to move relative to the metallic vessel 2. Since the metallic vessel 2 is reflective to microwave, the heating efficiency is lowered at the surface of the metallic vessel 2. The heating efficiency, however, is improved in the whole part of the vessel, because the substance 3 to be heated attaches to the surface of the spherical bodies, leaving the bottom of the metallic vessel 2, and, since the spherical bodies 4 rotate and move, the substance 3 to be heated is well mixed without stagnation so as to absorb the microwave at a high efficiency. A reference numeral 7 denotes a gas discharging port. In the case that the substance to be heated is a radioactive material, it is necessary to provide various equipment such as a plate for preventing reversing flow of radioactive substance, device for preventing the reversing of gas, off-gas treating device and so forth.

Figure 2:
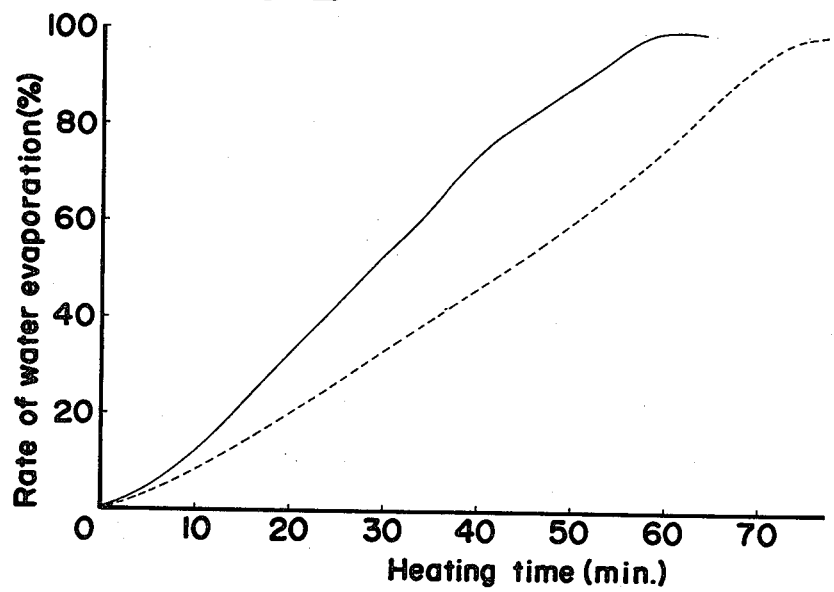
FIG. 2 is an illustration of the effect of the invention in comparison with that of the prior art.

FIG. 2 shows the result of a comparison test conducted to confirm the superiority of the invention. A slurry containing 10 to 20 wt.% of aluminum hydroxide and iron hydroxide was placed in a metallic saucer, and was heated by applying microwave. The rate of evaporation of water was plotted in relation to heating time. The solid-line curve shows the characteristic obtained with the method of the invention in which spherical bodies transmissive to microwave are used, whereas the dotted-line curve shows the characteristic obtained with the conventional method using no spherical bodies. From this test result, it is understood that, provided that a metallic saucer having no fear of breakage is used, the heating time can be reduced by at least 10 to 15 minutes for obtaining the same evaporation rate, as compared with the conventional method.

The method of the invention can apply not only to mere heating but also to various continuous treatment, as will be understood from the following description.

FIG. 3 shows an apparatus embodying the method of the present invention. A vertical cylindrical metallic vessel 11 is provided at its upper portion with a region 12 for supplying the substance to be treated and at its lower part with a region 13 for discharging resulting powders. A grid 14 provided at a lower part of the space in the vertical cylindrical vessel 11 carries a multiplicity of spherical bodies 15 made of a material transmissive to microwave. A vibration machine 16 disposed at the lower side of the vessel 11 is adapted to impart a movement to the spherical bodies 15. To the upper side of the vessel 11 is connected a microwave guiding port 18 and gas discharge port 19 through the medium of a bellows-type vibration absorption section 17. A membrane 20 for preventing the reversing the substance and gas is disposed in the vicinity of the microwave guiding port 18.

In operation, the substance to be treated is introduced from the supplying region 12 into the closed vessel 11 and is scattered or sprayed over the surfaces of the spherical bodies 15, so that the substance forms film on each spherical body 15. Then, the microwave is applied to effect the heating, while imparting movement to spherical bodies by vibration machine 16, so that the substance to be treated effectively absorbs the microwave without making stagnation around the metallic wall of the vessel 11. In addition, due to the friction and collision between adjacent spherical bodies 15, the substance to be treated is separated from the spherical bodies and crushed or pulverized. The attaching of the substance to the surface of the spherical bodies correspondingly elongate the time of stay of the substance in the vessel, so that the microwave can be absorbed at a high efficiency. Consequently, the substance to be treated supplied through the supplying region 12 is continuously heated to be separated into gases and powders which are discharged through the gas discharging port 19 and the powder discharging region 13, respectively.

In the apparatus shown in FIG. 3, the microwave guiding port 18 and the region 12 for supplying the substance to be treated are disposed at an upper part of the closed vessel 11. The positions and numbers of the microwave guiding port 18 and the substance supplying region 12 in the described embodiment, however, are not exclusive and may be varied and selected as necessitated. Also, the bellows-type vibration absorption section may be substituted by another type of vibration absorption device such as a cylinder-type one. It is also possible to provide an air ventilation port (not shown) in the vicinity of the membrane 20 to prevent the contamination of the latter, and to effect the control of critical safety by using a substance containing neutron poison as the material of the spherical bodies 15. As the neutron poison, compounds of boron or gadolinium can be employed, and the poison material may be embedded as a core in the spherical body.

It is also to be noted that the grid 14 can be moved upwardly or downwardly to decrease or increase the volume of the space of the treating chamber and to increase or decrease the number of spherical bodies used, thereby to permit the control of the time of stay of the substance to be treated in the vessel and, hence, the control of the particle size of the treated products.

Hereinafter, a description will be made as to another embodiment of the invention. The parts of this embodiment same as those of the first embodiment shown in FIG. 3 are denoted by the same reference numerals, and the detailed explanation of these parts are omitted.

In the embodiment shown in FIG. 4, there are provided two stages of grid 14. Each grid stage carries a multiplicity of spherical bodies 15. The movement of the spherical bodies is restricted to some extent such that the space on the upper stage of grid 14 is used for evaporation and drying, while the space on the lower stage is used for roasting and reduction. It is possible to provide, if required, a gas introduction port for the roasting reduction gas.

Although not shown, the construction shown in FIG. 4 may be separated into an upper stage and a lower stage, such that the lower part of the upper stage is contracted or narrowed to connect to the upper part of the lower stage.

In another embodiment shown in FIG. 5, the movement of the spherical bodies 15 is caused by the rotary movement and the force of gravity. The closed vessel 11 has an inversed conical shape and is rotatably supported by a bearing device 22 with its axis inclined. As in the cases of other embodiments hereinbefore described, a grid 14 is disposed inside of the vessel 11. At the same time, a multiplicity of spherical bodies 15 are mounted above the grid 14. As will be seen from FIG. 6, a multiplicity of baffle plates 23 are formed on the inner peripheral surface of the closed vessel to project inwardly therefrom. The closed vessel 11 is adapted to be driven rotatively by means of a driving device (not shown), so that a movement is imparted to the substance to be heated and the spherical bodies 15. Meanwhile, microwave is applied through the microwave guiding port 18 to heat the substance to be heated and the spherical bodies 15. The baffle plates 23 act to enhance the mutual collision and friction of the spherical bodies 15.

In the described embodiment, the closed vessel has an inversed conical shape and is mounted with its axis inclined. However, the closed vessel may have a cylindrical form and be mounted such that its axis extends horizontally.

In the embodiment shown in FIG. 7, in contrast to the embodiments heretofore described in which the movement of the spherical bodies is caused by vibration and rotation of the closed vessel itself, the closed vessel 11 itself is kept stationary. Namely, the embodiment shown in FIG. 7 incorporates a rotary blade 25 rotatably mounted in the vessel 11 and rotatively driven by means of a driving device (not shown) to impart a movement to the spherical bodies 15, as will be seen from FIG. 8. The rotary blade need not always be flat as illustrated.

Although the invention has been described through its several preferred embodiments, these are not exclusive and can be modified and changed as necessitated.

It the heat treating method and apparatus of the invention heretofore described, the problem of breakage of the heating vessel is completely avoided because the vessel may be made of a metal. In addition, the invention ensures a high microwave irradiation efficiency and can suitably be used in the continuous heat treatment. Further, the invention can be applied to various processes such as drying, roasting, reduction, crushing and so forth which are conducted simultaneously with or subsequently to the heating, to permit a remarkable increase of the amount of substance to be processed.

The method and apparatus of the invention provides a remarkable advantage particularly when applied to the treatment of radioactive substances. In such uses, it is possible to reduce the number of pieces of equipment installed in the area contaminated by nuclear materials and, in some cases, it is possible to conduct a plurality of tasks such as drying, roasting, reduction and crushing by a single equipment, so that the treating system as a whole can be simplified and reduced in size. In addition, the management of critical safety can be made easy by selecting the shape of the spherical bodies, use of material containing neutron poison as the material for the spherical bodies and so forth, to increase the amount of treatment. Also, the method and apparatus of the invention can be effectively used in the production of powders of a property which can be formed into pelletized nuclear fuel.

What is claimed is:

1. A heat treating method employing microwave which comprises:
   placing a plurality of spherical bodies mainly made of a material transparent to microwave in a vessel made of a material reflective to microwave;
   feeding a substance to be treated in a liquid form into the vessel and into contact with the spherical bodies;
   applying microwave to said substance in the vessel while imparting movement to the spherical bodies, whereby the substance to be treated is attached onto the surfaces of the spherical bodies and is heat-treated; and
   separating the thus heat-treated substance from the spherical bodies and pulverizing the substance due to the friction and collision between the adjacent moving spherical bodies.

2. A heat treating method according to claim 1, wherein said substance to be treated is continuously fed into said vessel and the heat-treated and pulverized substance is continuously discharged from said vessel while retaining the spherical bodies in said vessel.

3. A heat treating method according to claim 1, wherein said substance to be treated is continuously fed into the vessel by spraying the liquid substance to be treated onto the spherical bodies from the upper portion of the vessel, and the heat-treated and pulverized substance is in a powdered form and is continuously discharged from the lower portion of the vessel.

4. A heat treating method according to claim 1, wherein said spherical bodies contain a neutron poison material.

5. A heat treating apparatus using microwave comprising:
   a closed vessel made of a material reflective to microwave;
   a grid partitioning the space in said vessel;
   a plurality of spherical bodies mainly made of a material transparent to microwave and positioned on the side of said grid toward a microwave guide;
   means for imparting movement to said spherical bodies;
   means for supplying a substance to be treated in a liquid form onto said spherical bodies;
   means for guiding microwave to the substance to be treated while attached onto the surfaces of said spherical bodies; and
   means for discharging the heat-treated substance which has been transferred through said grid to the other side of said grid.

6. A heat treating apparatus according to claim 5, wherein said grid is movable in the longitudinal direction of the vessel.

7. A heat treating apparatus according to claim 5, wherein said grid is disposed in said vessel in a plurality of stages at a suitable distance, and each grid stage carries said spherical bodies.

8. A heat treating apparatus according to claim 5, wherein said means for imparting movement comprises a vibrator connected to said vessel to vibrate said vessel.

9. A heat treating apparatus according to claim 5, wherein said closed vessel is a vertical cylindrical vessel, said spherical bodies are positioned on the grid, said means for discharging the heat-treated substance is positioned below the grid, and said means for supplying the substance to be treated is positioned at the upper portion of the vessel such that said substance to be treated is sprayed onto the spherical bodies.

10. A heat treating apparatus according to claim 5, wherein said means for imparting movement comprises a rotary blade mounted in said vessel.

11. A heat treating apparatus according to claim 5, wherein said closed vessel is a cylindrical vessel disposed horizontally, and said means for imparting movement comprises means for rotating the vessel about its axis.

12. A heat treating apparatus according to claim 5, wherein said closed vessel is an inclined cylindrical vessel with means for supplying a substance to be treated at an elevated end portion of the vessel, and said means for imparting movement comprises means for rotating the vessel about its axis.

13. A heat treating apparatus according to claim 5, wherein said closed vessel has an inversed conical shape with its axis inclined and having means for supplying a substance to be treated at an elevated end portion of the vessel, and said means for imparting movement comprises means for rotating the vessel about its axis.

14. A heat treating apparatus according to claim 5, wherein said spherical bodies contain a neutron poison material.

* * * * *